United States Patent [19]

Raatz et al.

[11] Patent Number: 4,724,067
[45] Date of Patent: Feb. 9, 1988

[54] STABILIZED AND DEALUMINATED OMEGA ZEOLITE

[75] Inventors: Francis Raatz, Rueil-Malmaison; Christian Marcilly, Houilles, both of France

[73] Assignee: Institut Francais du Petrole, Rueil-Malmaison, France

[21] Appl. No.: 876,146

[22] Filed: Jun. 19, 1986

[30] Foreign Application Priority Data

Jun. 19, 1985 [FR] France ................. 85 09432
Jul. 8, 1985 [FR] France ................. 85 10529
Jul. 16, 1985 [FR] France ................. 85 10990

[51] Int. Cl.$^4$ ............................................. C10G 11/05
[52] U.S. Cl. ........................................ 208/120; 502/64
[58] Field of Search .................... 208/120; 502/60, 64

[56] References Cited

U.S. PATENT DOCUMENTS

| | | | |
|---|---|---|---|
| 3,812,199 | 5/1974 | Chen et al. ........................... | 208/120 |
| 3,944,482 | 3/1976 | Mitchell et al. ..................... | 208/120 |
| 4,093,560 | 6/1978 | Kerr et al. ........................... | 208/120 |
| 4,120,825 | 10/1978 | Ward ..................................... | 502/64 |
| 4,197,186 | 4/1980 | Short et al. ........................... | 502/60 |
| 4,228,036 | 10/1980 | Swift et al. ........................... | 208/114 |
| 4,241,036 | 12/1980 | Flanigen et al. ..................... | 502/62 |
| 4,297,335 | 10/1981 | Lok et al. ............................. | 502/60 |
| 4,331,643 | 5/1982 | Rubin et al. ......................... | 502/77 |
| 4,430,200 | 2/1984 | Shihabi ................................ | 208/120 |
| 4,481,104 | 11/1984 | Walsh ................................... | 502/64 |
| 4,515,902 | 5/1985 | Shioiri et al. ....................... | 502/64 |
| 4,587,115 | 5/1986 | Arika et al. ......................... | 502/79 |
| 4,588,496 | 5/1986 | Scherzer ............................. | 502/79 |
| 4,591,576 | 5/1986 | Chiang et al. ....................... | 502/65 |
| 4,606,900 | 8/1986 | Kacirek et al. ..................... | 502/60 |

OTHER PUBLICATIONS

"Thermochemical Properties of Ammonium Exchanged Type Omega Zeolite," Thomas J. Weeks et al.
Klug, Harold & Alexander, Leroy, "X-Ray Diffraction Procedures for Polycrystalline and Amorphous Materials," New York, 1978, pp. 14–47.
J. Chem. Soc., Chem. Commun., "On the Siting of Aluminium in Zeolite Omega," Klinowski, Jacek et al., 1983, pp. 525–526.
Leach, H. Frank & Marsden, Christine E. "Isomerization Reactions of Substituted Cyclopropanes Over Zeolite Omega," *Catalysis in Zeolites*, 1980.
Beyer, Hermann K. & Belenykaja, Ita, "A New Method for the Dealumination of Faujasite-Type Zeolites," *Catalysis by Zeolites*, 1980, pp. 203–210.
Araya, Abraham et al., "The Synthesis and Thermal Behaviour of Zeolite," *Zeolites*, 1984, vol. 4, Jul., pp. 263–269.
Meier, W. M. & Olson, D. H., "Atlas of Zeolite Structure Types," published by the Structure Comm. of the International Zeolite Assoc., 1978, p. 61.

*Primary Examiner*—Helen M. S. Sneed
*Assistant Examiner*—Anthony McFarlane
*Attorney, Agent, or Firm*—Millen & White

[57] ABSTRACT

The invention concerns a stabilized and dealuminated omega zeolite, its manufacture and use in catalytic cracking.

It has in particular a $SiO_2/Al_2O_3$ molar ratio higher than 10, a sodium content lower than 0.3%, "a" and "c" crystalline parameters respectively lower than or equal to 1.814 nm and 0.760 nm, a particular capacity for nitrogen adsorption and a particular lattice of secondary pores.

12 Claims, No Drawings

STABILIZED AND DEALUMINATED OMEGA ZEOLITE

The present invention relates to a new improved catalyst for cracking heavy oil fractions, whose basic constituent is a stabilized and dealuminated omega zeolite. More precisely, this catalyst is characterized by the presence therein, for example in a proportion of 3 to 50% by weight, of an omega zeolite of very reduced alkali ions content, whose total $SiO_2/Al_2O_3$ molar ratio is at least 10, diluted in a matrix whose main constituent is for example amorphous silica-alumina and/or clay. This new catalyst exhibits, at similar conversion rate and coke production, a selectivity to middle distillates (LO) higher than that of most of the prior art catalysts.

BACKGROUND OF THE INVENTION

The use of the catalytic cracking process in the oil industry at the end of the thirties represented considerable progress with respect to the previous techniques, by providing for highly improved yields of motor gasoline of very high grade. The first processes operating in a fixed bed (e.g. HOUDRY process) were quickly surpassed by moving bed processes and mainly, since the middle of the forties, by the fluid bed processes (FCC or Fluid Catalytic Cracking). At the very beginning of their use, the catalytic cracking processes were almost exclusively devoted to the treatment of relatively light Vacuum Distillates (VD) of low sulfur content (final boiling point lower than 540°-560° C.).

The cracking of these charges is performed at about 500° C. at a total pressure close to atmospheric pressure and in the absence of hydrogen. In these conditions the catalyst becomes quickly covered with coke deposits and its continuous regeneration is necessary. In the fluid bed or moving bed cracking processes (FCC or TCC) the catalyst continuously circulates between a reaction zone where its residence time is from about several seconds to a few tens of seconds and the regenerator where it is freed from coke by combustion at a temperature from about 600° to 750° C. in the presence of diluted oxygen. The fluid bed units (FCC) are now much more widely used than those of the moving bed type. In these units the catalyst circulates in fluidized state, as small particles of average diameter ranging from 50 $\mu$m to 70 $\mu$m, the particle size of said powder ranging approximately from 20 $\mu$m to 100 $\mu$m.

The catalysts used in the first FCC units were solids of high silicon content obtained by acid treatment of natural clays or synthetic silica-aluminas. Some of the main improvements achieved by FCC up to the end of the fifties have been:

The use of the spray-drying technique whereby the catalysts are obtained as fine spherical particles adapted to be more easily fluidized and more resistant to attrition than the powders obtained by crushing, The manufacture of synthetic silica-aluminas, initially of high silica content "low alumina" or Lo-Al of about 85% by weight silica content, and then of higher alumina content ("High Alumina" or Hi-Al of about 75% by weight $SiO_2$ content), and Various very important improvements concerning metallurgy and design of equipments, particularly for regeneration.

But it is only at the beginning of the sixties that a major improvement was achieved in the field of catalytic cracking by the use of molecular sieves and more precisely of zeolites of the faujasite structure, first in a moving bed process, then, a little later, in FCC. These zeolites, incorporated to a matrix consisting mainly of amorphous silica-alumina, optionally containing variable proportions of clay, are characterized by cracking activities, with respect to hydrocarbons, of about 1000 to 10000 times those of the initial catalysts. The availability on the market of these new zeolite catalysts has resulted in a drastic change of the cracking process both by a very substantial increase of the activity level and of the selectivity to gasoline and by considerable changes in the unit technology, mainly:

cracking in the "riser" (tube wherethrough the catalyst and the charge flow upwardly, for example),
decrease of the contact times,
modification of the regeneration techniques.

X zeolite (Faujasite structure characterized by a $SiO_2/Al_2O_3$ molar ratio from 2 to 3) was the first used. Highly exchanged with rare-earth ions, it had a high activity and high thermal and hydrothermal resistance. Toward the end of the sixties, this zeolite was progressively replaced by Y zeolite, whose tendency to produce coke was slightly less and whose thermal and hydrothermal resistance was greatly improved. To date, in a large part, (probably more than 90%) the proposed catalysts contain a Y zeolite exchanged with rare-earths ions and/or ammonium ions.

From the beginning of the seventies, the oil industry suffered from a shortage of crude oil supply whereas the demand for gasoline of high octane number still increased. Moreover, heavier and heavier crude oils were progressively included in the available supply. The treatment of the latter was a difficult problem for the refiner in view of their high content of catalyst-poisoning substances, particularly nitrogenous compounds and metal compounds (mainly nickel and vanadium), unusual values of Conradson Carbon and mainly asphaltene compounds.

The required treatment of heavier charges and other more recent problems such as the progressive, but general, decrease of the proportion of lead-containing additives in gasoline, the low, but significant, evolution in various countries of the demand for middle distillates (kerosene and gas-oils), have induced refiners to undertake further searches with a view toward obtain catalysts having the following improved performances:

better thermal and hydrothermal stability and better tolerance to metals,
lower coke formation at equal conversion rate,
production of a gasoline of higher octane number,
improved selectivity to middle distillates.

In view of the present tendency of the charges to produce more and more coke on the catalyst and of the high sensitivity to coke of the zeolite performances, it is now desirable, not only to search for catalysts less selective to coke but also to further the catalyst regeneration in order to reduce to a minimum the coke amount at the end of the combustion, and this requires, in certain processes, an increase of the regenerator temperature. Thus it happens that high steam partial pressures from 0.2 to 1 bar prevail in the regenerator with local temperatures, at the catalyst level, from 750° to 850° C. or even 900° C., for a time from a few tens of seconds to a few minutes. In these conditions, the zeolite, which is the main active agent of the catalyst, may quickly lose a substantial part of its activity as a result of an irreversible degradation of its structure. In spite of the various technological tricks used during the last years to reduce the regenerator temperature (addition of coils to remove heat by producing steam or by intermediary cooling of the catalyst) or for reducing the steam content at high temperature (techniques with two regenerators as used in the R2R TOTAL-I.F.P. process) it is necessary that the zeolite present in the cracking catalyst exhibit an excellent thermal and hydrothermal stability.

SUMMARY OF THE INVENTION

The stabilized and dealuminated omega zeolite used according to the present invention has very interesting cracking properties with respect to heavy charges which differ from those of the zeolites of faujasite structure (such as Y zeolite) used in the industrial cracking catalysts of the prior art. These dealuminated omega zeolites also have the following advantages:

a high thermal and hydrothermal stability, the interest of which has already been stated.

a capacity to limit coke production.

an excellent selectivity to middle distillates.

The stabilized and dealuminated omega zeolite used in the catalysts according to the present invention is characterized by a $SiO_2/Al_2O_3$ molar ratio higher than 10, a sodium content lower than 0.3% by weight and preferably lower than 0.01% by weight. The stabilized and dealuminated solid keeps the X-ray diffraction spectrum of $\Omega$ zeolite with respective crystalline parameters a and c at most equal to 1.814 nm and 0.760 nm.

Its nitrogen adsorption capacity by weight, at 77 K under a partial pressure P/Po of 0.19, is higher than 5%, preferably than 8% and more particularly than 11%. The solid obtained according to the invention has a secondary lattice of pores of radii ranging from 1.5 nm to 14 nm, preferably from 2 nm to 6 nm. The volume of the secondary pores represents 5 to 70% of the zeolite total pore volume, (preferably 5–50%).

The manufacturing procedure of the above-described product is based on alternating ion exchanges with ammonium cations, acid etchings and (or) thermal treatments in the presence or absence of steam. These treatments have been used in the prior art to stabilize various zeolites. However $\Omega$ zeolite is known as having a very low stability. The preparation of stabilized and dealuminated $\Omega$ zeolites, particularly by the above-mentioned treatments, was unsuccessful up to now. The decationization and dealumination treatments according to the invention considerably improve the acid properties of $\Omega$ zeolite which may then be used as catalyst or catalyst carrier in such reactions as cracking and hydrocracking.

OMEGA zeolite (called ZSM-4 by MOBIL Company) is the synthetic counterpart of MAZZITE which is a natural zeolite. $\Omega$ zeolite is synthesized in the presence of sodium cations, and of organic cations generally TMA (tetrapropylammonium) (Dutch Pat. No. 6 710 729, U.S. Pat. No. 4,241,036). The Na/TMA molar ratio is generally close to 4 (T. WEEKS, D. KIMAK, R. BUJALSKI and A. BOLTON, JCS Farad Trans 1, 72, (1976), 57); F. LEACH and MARSDEN, Catalysis by Zeolites, B. IMELIK ed, 1980, p. 141, Elsevier Amsterdam), and the $SiO_2/Al_2O_3$ molar ratio is in the range from 5 to 10 (U.S. Pat. No. 4,241,036); T. WEEKS, D. KIMAK, R. BUJALSKI and A. BOLTON, JCS. Farad Trans 1, 72, 1976, 57, F. LEACH and C. MARSDEN, Catalysis by Zeolites, B. IMELIK ed., 1980, p. 141, Elsevier Amsterdam; A. ARAYA, T. BARBER, B. LOWE, D. SINCLAIR and A. VARMA, Zeolites, 4, (1984), 263. $\Omega$ zeolite crystallizes in the hexagonal system with parameters $\vec{a}$ and $\vec{c}$ respectively close to 1.82 nm and 0.76 nm (T. WEEKS, D. KIMAK, R. BUJALSKI and A. BOLTON, JCS Farad Trans 1, 72 (1976), 57, R. BARRER and H. VILLIGER, Chem Comm. (1969), 65. The $\Omega$ zeolite structure is formed by the arrangement of gmelinite cages interconnected along axis $\vec{c}$ (W. MEIER, D. OLSON, Atlas of Zeolites Structures Types, DRUCK+VERLAG AG, Zurich, 1978). The particular arrangement of the gmelinite cages in $\Omega$ zeolite provides in the structure a lattice of 12-sided channels of diameter close to 0.74 nm, parallel to $\vec{c}$ axis.

With pores of about 0.7 nm diameter, the $\Omega$ zeolite comes under the category of zeolites with a wide pore opening, making it particularly attractive for reactions such as cracking and hydrocracking. Although some of its properties are a priori of interest in catalysis, the catalytic performances of $\Omega$ zeolite still have not been much investigated. Only a limited number of reactions, such for example as isomerization of substituted cyclopropanes (F. LEACH and C. MARSDEN, Catalysis by Zeolites, B. IMELIK ed. 1980, p. 141, Elsevier Amsterdam) or n-heptane cracking have been studied (A. Perrota et al., Catal 55, 1978, 240)

For this latter reaction the authors indicate that, after exchange with $NH_4^+$ and roasting at 500° C., $\Omega$ zeolite has an initial activity higher than that of Y zeolite. However, when so treated, $\Omega$ zeolite deactivates very quickly.

The main reason for the limited number of studies devoted, up to now, to the catalytic properties of $\Omega$ zeolite, is the low thermal stability of said zeolite. As a matter of fact, it is well known in the scientific literature that $\Omega$ zeolite as NaTMA or $NH_4TMA$ may be destroyed (T. WEEKS D. KIMAK, R. BUJALSKI and A. BOLTON, JCS Farad Trans 1, 72, (1976) or may undergo a considerable decrease of its crystallinity (F. LEACH and C. MARSDEN, Catalysis by zeolites, B. IMELIK ed, 1980, p. 141, Elsevier, Amsterdam) by roasting above 600° C. Many reasons have been set forth to explain the brittleness of $\Omega$ zeolite during thermal treatments. This brittleness could be due to the too small size of the crystals (T. WEEKS, D. KIMAK, R. BUJALSKI and A. BOLTON, JCS Farad Trans 1, 72, (1976), 57; A. ARAYA; T. BARBER, B. LOWE, D. SINCLAIR and A. VARMA, zeolites, 4, (1984), 263) or could result from the particular action of TMA cations in the crystalline structure (T. WEEKS, D. KIMAK, R. BUJALSKI and A. BOLTON, JCS Farad Trans 1, 72, (1976), 57). The reason for the thermal brittleness of $\Omega$ zeolite still remains not well understood.

In certain operating conditions, it is possible to partly save the crystallinity of $\Omega$ zeolite during thermal treatments. However, as indicated below, the obtained products are not interesting for acid catalysis. The roasting of a NaTMA $\Omega$ form in low amount in an apparatus of differential thermal analysis leads to a solid which remains crystallized at 800° C. (A. ARAYA, T. BARBER, B. LOWE, D. SINCLAIR and A. VARMA, Zeolites, 4 (1984), 263); such a solid is not dealuminated and still contains all the initial alkali cations. The roasting, in conditions of thick bed, of the $NH_4TMA$ $\Omega$ form, also leads to an increase of the thermal stability (T. WEEKS, D. KIMAK, R. BUJALSKI and A. BOLTON, JCS Farad Trans 1, 72, (1976), 57) but the obtained solids have only a very limited activity in hydrocracking and isomerization.

With respect to the dealumination of $\Omega$ zeolite, several techniques have been proposed. These techniques, which will be described hereinafter, do not provide solids having the desired specifications, particularly a high $SiO_2/Al_2O_3$ ratio combined with the existence of a secondary pore lattice. U.S. Pat. No. 3,937,791 discloses the dealumination of various zeolites, including $\Omega$ zeolite, by Cr (III) salts. This method leads to a replacement of the aluminum atoms by chromium atoms. Whereas the structure is dealuminated, its chromium content is also fatally increased. U.S. Pat. No. 4,297,335 recommends a dealumination technique by treatment with fluorine gas at high temperature. This treatment is applicable to various zeolites but, when applied to $\Omega$ zeolite, it results in a degradation of the crystalline structure. European Pat. No. 100,544 discloses the dealumination of many zeolites, including $\Omega$ zeolite, by roasting in the presence of $SiCl_4$ at temperatures lower than 200° C., in spite of the fact that higher temperatures are known to be necessary for dealuminating zeolites by said technique (BEYER et al catalysis by zeolites, (1980) p. 203). The dealumination of $\Omega$ zeolite by $SiCl_4$ is in fact possible but at high temperatures of about 500° C. for example (J. KLINOWSKI, M. ANDERSON and J. THOMAS, JCS, Chem. Commun. 1983, p. 525, O. TERASAKI, J. THOMAS, G. MILLWARD Proc. R. Soc. London (A), 395 (1808), 153-64). However, even in these conditions, the increase of the Si/Al ratio is apparently limited since the latter only increases from 4.24 before the treatment to 4.5 after the treatment (J. KLINOWSKI, M. ANDERSON and J. THOMAS J.C.S., Chem. Commun. 1983, p. 525). Inasmuch as the dealumination by treatment with $SiCl_4$ is applicable to $\Omega$ zeolite, it is essential to emphasize that this technique leads to the irremediable replacement of the aluminum atoms of the structure by silicon atoms (H. HEYER and I. BELENYKAJA, Catalysis by Zeolites, B. IMELIK et al editors (1980), p. 203, Elsevier Amsterdam). The obtained zeolite thus remains perfectly microporous. It does not exist, as in the technique recommended according to the present invention, a creation of a a secondary pore lattice. The secondary lattice has an important action in the conversion of heavy hydrocarbons. On the other hand, according to J. KLINOWSKI et al, J.C.S., Chem. Commun. 1983, p. 525, the mesh size of $\Omega$ zeolite, dealuminated by $SiCl_4$, increases, exactly at the opposite of the result obtained by the method according to the present invention.

Finally, it appears that, in the present state of the art, it is not known how to prepare $\Omega$ zeolites in hydrogen form, stabilized, dealuminated, of small mesh volume and having a secondary pore lattice. From $\Omega$ zeolites having these properties it is possible to prepare active and selective catalyst for cracking and hydrocracking reactions.

It has been observed, according to the present invention, that it is possible, by alternating ion exchanges and acid etchings with thermal treatments, to obtain from $\Omega$ zeolite produced by synthesis (of Na-TMA type for example), whose $SiO_2/Al_2O_3$ molar ratio ranges from 6 to 10, a well crystallized $\Omega$ zeolite in hydrogen form, of sodium content lower than 0.3%, preferably lower than 0.01% and whose $SiO_2/Al_2O_3$ ratio is higher than 10 and, sometimes, according to the type of use, higher than 30 or even 50.

The ion exchanges and acid etchings are performed at temperatures ranging from 0° to 150° C. For ion exchanges, solutions of ionizable salts are used. The acid etchings are performed in solutions of inorganic acids (hydrochloric acid for example) or organic acids (acetic acid for example). The thermal treatments are conducted between 400° and 900° C. with or without steam injection. The product obtained at the end of these various treat-steps has a X-ray diffraction spectrum which is that of $\Omega$ zeolite (Table 2). The crystalline parameters have the following sizes: $\overline{a}$ is preferably in the range from 1.814 nm to 1.794 nm, $\overline{c}$ is preferably in the range from 0.760 nm to 0.749 nm. The nitrogen adsorption capacity at 77 K for a partial pressure $P/Po=0.19$ is higher than 5% by weight. The more lattice is no longer formed only of micropores but comprises a lattice of mesopores whose radii, measured by the BJH method (see below), range from 1.5 nm to 14 nm and more particularly from 2 to 6 nm. The volume of the mesopores corresponds to about 5 to 50% of the total pore volume of the zeolite.

Characterization of Dealuminated $\Omega$ Zeolites

The $\Omega$ zeolite of high silicium content obtained according to the present invention has been characterized by the following techniques:

X-ray diffraction

The apparatus comprises: a PHILIPS generator PW 1130 (35 mA, 35 kV), a PHILIPS goniometer PW 1050, a Cu tube (fine focus) a graphite crystal rear monochromator, an automatic sample feeder.

From the X-ray diffraction spectra, measurements were made, on each sample, of the bottom surface over an angular interval (2$\Theta$) from 6° to 32° on the one hand, and, in the same zone, of the lines surface, expressed as the number of pulses for a step-by-step recording of 2 seconds with steps of 0.02° (2$\Theta$). The percentage of crystallized product is expressed as the ratio (lines surface/total surface). Then the ratios of each treated sample are compared with a standard reference of the same series as the sample and containing a sodium amount of at most 3% by weight. Thus the crystallinity rate is expressed in percent with respect to an arbitrary reference of 100.

A good selection of the reference is important, since, sometimes, an intensity enhancement or decrease of the lines may occur in relation with the cations content of the samples.

Microporosity and mesoporosity

The secondary mesoporosity is determined by the BJH method (BARRET, JOYNER, HALENDA, J. Am. Chem. Soc, 73, (1951), 373) based on the digital processing of the nitrogen desorption isotherm; the total pore volume is measured at a nitrogen pressure P such that $P/Po=0.95$, Po being the nitrogen saturating vapor pressure at the temperature of the measurement. The micropore volume is calculated from the amount of adsorbed nitrogen at $P/Po=0.19$.

Quantitative analysis

The chemical composition of the samples have been determined by conventional chemical analysis: X-ray fluorescence and atomic adsorption.

Preparation of Dealuminated $\Omega$ Zeolites

The initial $\Omega$ zeolite is obtained by synthesis. It contains alkali cations (generally Na$^+$) and organic cations (generally TMa or TPA). The ratio $$\frac{\text{alkali cations}}{\text{organic cations + alkali cations}}$$

generally ranges from 1.0 to 0.50 and the ($SiO_2/Al_2O_3$) molar ratio ranges from 6.5 to 10.

The method used according to the present invention to obtain a dealuminated and stabilized Ω zeolite is as follows:

There is first prepared, according to techniques known in the art, a non-dealuminated zeolite free or organic cations and of very low alkali content (sodium content lower than 0.3% and preferably lower than 0.01% by weight). One of the methods for obtaining said intermediary Ω zeolite is as follows:

Removal of organic cations by roasting under a mixture of inert gas+oxygen (the oxygen molar content is higher than 2% and preferably higher than 10%) at a temperature from 450° to 650° C. and preferably from 500° to 600° C., for more than 20 mn.

Removal of the alkali cations by at least one cation exchange at a temperature from 0° to 150° C. in a solution of ionizable ammonium salt (nitrate, sulfate, chloride, acetate, etc . . . ) of molarity from 3 up to saturation, preferably from 4 to 10.

It is possible to reverse the order of the organic cation removal and the alkali cation removal or to omit the step of thermal decomposition of organic cations.

At the end of this series of treatments, the solid is not dealuminated and contains less than 0.3% and preferably less than 0.01% by weight of sodium.

The Ω zeolite obtained after this first series of treatments, is subjected to a roasting, optionally in the presence of steam. Two techniques may be used:

roasting in air or in inert atmosphere, preferably containing from 5 to 100% of steam with total flow rate for example from 0.01 to 100 $lh^{-1} g^{-1}$. The roasting temperature is preferably from 500° to 900° C., the treatment time being higher than ½ hour and preferably than 1 hour.

roasting between 500° and 900° C. in confined atmosphere, i.e. without any external gas flow. The steam necessary for the treatment is then supplied by the product itself (self steaming).

After roasting, in the optional presence of steam, Ω zeolite is subjected to at least one acid etching at a temperature from 0° to 150° C. The relevant acids may be inorganic (hydrochloric, nitric, hydrobromic, sulfuric, perchloric acid) or organic (acetic or benzoic acid for example). The normality of the acid is generally from 0.1 to 10N (preferably from 0.5 to 2.0N) with a volume/weight ratio, expressed in $cm^3.g^{-1}$ ranging from 2 to 10. The treatment time is higher than ½ hour. It is preferable to perform the acid etching under controlled conditions to avoid the possible degradation of the solid. Accordingly, the zeolite may be suspended in distilled water and the acid is then progressively added.

In order to obtain a stabilized Ω zeolite of high $SiO_2/Al_2O_3$ molar ratio (higher than 10), according to the present invention, the preferred procedure is as follows:

(1) Removal of organic cations by roasting in air.
(2) Exchange of alkali cations ($Na^+$) with ammonium cations.
(3) Roasting in the presence of steam.
(4) Acid etching.

In order to obtain the desired $SiO_2/Al_2O_3$ ratio, it is necessary to conveniently select the operating conditions; for this purpose the most critical parameters are temperature and steam content in step (3), the severity degree in step (4) (acid concentration, acid nature, temperature). When particularly high $SiO_2/Al_2O_3$ ratios, for example ratios higher than 30 or 50, are desired, it may be necessary to proceed in several cycles (roasting-acid etching).

The Ω zeolite, whose characteristics and manufacture have just been indicated, must be dispersed within an amorphous matrix in order to be used as cracking catalyst. All the known matrices used for cracking catalysts in the prior art may be convenient. Preferably they will contain silica-aluminas and clays as major constituents and also, optionally, small amounts of various oxides such for example as alumina. The stabilized and dealuminated Ω zeolite may be introduced in the matrix in hydrogen form or after exchange with ions of various metals, of alcaline-earths such as $Mg^{2+}$ or $Ca^{2+}$, or preferably from the rare-earths family, such particularly as $La^{3+}$, $Ce^{3+}$, $Nd^{3+}$, $Pr^{3+}$ etc.

This omega zeolite, stabilized, dealuminated and optionally exchanged with the various above-mentioned cations, may be added as a complementary active agent within the matrix of a conventional catalyst already containing one or more zeolites of different structures, particularly zeolites of the faujasite, X or Y structures or of pentasil type such as ZSM5 or ZSM11. Examples of faujasite structures, the best convenient for catalysts containing dealuminated omega zeolite, as secondary zeolite structure, are particularly stabilized Y zeolite, currently called ultrastable or USY, either in hydrogen form or in a form exchanged with alkaline-earth cations and mainly rear-earths.

EXAMPLES

The following examples are given to illustrate the invention and must not be considered as limiting the scope thereof.

Example 1: Preparation of a stabilized and dealuminated Ω zeolite of ($SiO_2/Al_2O_3$) molar ratio of 12

50 g of Ω zeolite of molar composition 0.90 $Na_2O$, 0.10 $TMA_2O$ $Al_2O_3$, 8.5 $SiO_2$ are roasted at 550° C. for 2 hours in a mixture $N_2+O_2$ ($N_2$ flow rate of 50 $lh^{-1}$, $O_2$ flow rate of 5 $lh^{-1}$) so as to decompose the TMA cations.

At the end of the roasting step, the zeolite is exchanged three times in 200 $cm^3$ of $NH_4NO_4$ 4N solution at 100° C. for 4 hours. The obtained product, referenced OM1, has a sodium content lower than 0.1% by weight.

The decationized OM1 zeolite is roasted in steam under the following conditions:
rate of temperature increase: 10° C. $mn^{-1}$
air flow rate: 4 $lh^{-1}g^{-1}$
60% molar steam
final temperature of 600° C., 2-hour step.

After roasting under steam, the Ω zeolite is subjected to acid etching according to the following procedure:
HCl=0.5N
V/P ratio=10 $cm^3$ of solution per g of dry solid
T=80° C., treatment time of 4 hours under stirring.

The solid referenced OM2 obtained by these treatments has the X-ray diffraction spectrum of Ω zeolite. Its physico-chemical properties are as follows:

| $\frac{SiO_2}{Al_2O_3}$ moles | Characteristics of OM2 Ω zeolite (adsorption capacity at 77 K, P/Po:0.19) | | Adsorption capacity $N_2$ (% by weight) |
|---|---|---|---|
| | X-ray diffraction | | |
| | Crystallinity % | Parameters a (nm) c (nm) | |
| 12 | 85% | 1.813  0.759 | 11 |

The OM2 zeolite exhibits a lattice of secondary mesopores generated by the treatments to which it has been subjected. These mesopores are centered at about 4 nm of radius. (60% of the pores at about 4 nm, the remainder between 2 and 14 nm). Total pore volume: 0.3 g/cc; volume of the secondary pores: 63% of the total pore volume.

By way of example, Table 2 hereinafter gives the characteristics of the X-ray diffraction diagram of an Ω zeolite.

Example 2: Preparation of a stabilized and dealuminated Ω zeolite having a SiO₂/Al₂O₃ ratio of 20

50 g of decationized OM1 zeolite, prepared in the conditions of example 1, are subjected to a roasting step under steam and then an acid etching according to the following procedures:

Roasting under steam
rate of temperature increase: 10° C. mn⁻¹
air flow rate: 4 lh⁻¹g⁻¹
steam injection at 400° C., 70% molar steam content
final temperature of 650° C., 2-hour step.
Acid etching
HCl 0.5N
V/P ratio=10 cm³ solution/g of dry solid
T=100° C., treatment time of 4 hours under stirring.

As for solid OM2 of example 1, the solid obtained by the preceding treatments, referenced OM3, has a X-ray diffraction spectrum which is typical of Ω zeolite as well as a lattice of secondary mesopores centered about 4 nm of radius.

The main physico-chemical characteristics of OM3 Ω zeolite are as follows:

| $\frac{SiO_2}{Al_2O_3}$ moles | X-ray diffraction | | Adsorption capacity Nitrogen (% by weight) |
|---|---|---|---|
| | Crystallinity % | Parameters a (nm) c (nm) | |
| 20 | 88% | 1.811  0.756 | 14 |

Total pore volume: 0.3 g/cc; volume of the secondary pores: 65% of the total pore volume.

Example 3: Comparative example. Preparation of Ω zeolite in hydrogen form having a SiO₂/Al₂O₃ ratio of 8

100 g of Ω zeolite of molar formula 0.90 Na₂O, 0.10 TMA₂O, Al₂O₃, 8 SiO₂ is subjected to roasting at 550° C. for 2 hours under a mixture of N₂+O₂ (N₂ flow rate of 70 lh⁻¹, O₂ flow rate of 7 lh⁻¹) in order to remove the TMA cations.

After roasting, the solid is exchanged three times in 500 cm³ of a NH₄NO₃6N solution at 100° C. for 4 hours. The obtained zeolite is referenced OM4. It has a X-ray diffraction spectrum typical of Ω zeolite. Its physico-chemical characteristics are as follows:

| $\frac{SiO_2}{Al_2O_3}$ moles | % Na b.w. | X-ray diffraction | | Adsorption capacity Nitrogen (% by weight) |
|---|---|---|---|---|
| | | Crystallinity % | Parameters a (nm) c (nm) | |
| 8 | 0.04 | 100% | 1.818  0.761 | 12 |

In contrast to dealuminated Ω zeolites OM3 and OM2, the non-dealuminated zeolite OM4 has no secondary mesopore lattice.

Example 4: Preparation of a HY zeolite having a SiO₂/Al₂O₃ ratio of 12 and a crystalline parameter of 2.445 nm. (comparative)

100 g of NY zeolite of molar composition Na₂O, Al₂O₃, 4.7 SiO₂ are exchanged three times in 600 cm³ of a NH₄NO₃8N solution at 100° C. for 4 hours. The NH₄Y form obtained at the end of these exchanges has a residual sodium content of 1% by weight.

The NH₄Y zeolite is roasted in the presence of steam at 550° C. under the following conditions:
rate of temperature increase: 20° C. mn⁻¹
air flow rate: 2 lh⁻¹g⁻¹
steam injection at 400° C., molar steam content equal to 80%
treatment time at the final temperature: 4 hours At the end of the roasting step, the solid is treated in 500 cm³ of a 1N hydrochloric acid solution at 100° C. for 4 hours.

The solid obtained at the end of these various steps is a HY zeolite having the following physico-chemical characteristics:

| Na % (b.w.) | $\frac{SiO_2}{Al_2O_3}$ (moles) | X diffraction | | Adsorption capacity % by weight Nitrogen |
|---|---|---|---|---|
| | | Crystallinity (%) | Parameter (nm) | |
| 0.3 | 12 | 90 | 2.445 | 20% |

Total pore volume: 0.35 cc/g.

Example 5: Preparation of a dealuminated Ω zeolite having a SiO₂/Al₂O₃ ratio of 20, retroexchanged with rare-earths In a first step, a dealuminated and a stabilized Ω zeolite of Si₂/Al₂O₃ ratio equal to 20 is prepared in conformity with example 2; the obtained Ω zeolite has the same physico-chemical characteristics as those of OM3 (example 2).

100 g of OM3 zeolite are subjected to an exchange in 1000 cm³ of a rare-earths solution of 0.15N rare-earths molarity. The exchange is performed at 100° C. for 4 hours. During the exchange the pH is controlled and maintained between 5 and 5.5. The composition of the rare-earths mixture used for the exchange is as follows by weight:
La₂O₃=57% by weight
CeO₂=15% by weight
Nd₂O₃=21% by weight
Pr₆O₁₁=7% by weight At the end of the exchange a rare-earth Ω zeolite, Ω Re is obtained whose total rare-earths content is 4.8%. The so-exchanged solid has kept the same SiO₂/Al₂O₃ ratio as OM3 and the X-ray diffraction spectrum of Ω zeolite; it is referred to as OM5.

By way of example it could be possible to manufacture catalysts from zeolites prepared according to examples 1 to 5, by diluting said zeolites in a proportion of, for example, 20% by weight in an amorphous silica of controlled granulometry similar to that of zeolites.

Example 6: Hydrothermal ageing tests and measurement of the catalytic performances in a micro-unit The various zeolites obtained in examples 1 to 5 are pelletized and then reduced to small aggregates by means of a crushing machine. The fraction of a particle size from 40 microns to 200 microns is then recovered by screening.

Each of the so-obtained powders is subjected to the following hydrothermal treatment: 8 hours at 750° C. under a steam partial pressure of 1 bar.

After this treatment the crystalline parameters of the various samples have changed. The new values are reported in Table 1 below.

This example has just for object the simulation of an industrial ageing on a fresh zeolite.

TABLE 1

Crystalline parameters of various zeolites after hydrothermal treatment

| Characteristics | (1) OM2 | (2) OM3 | (3) OM4 | (4) HY | (5) Ω Re |
|---|---|---|---|---|---|
| a nm | 1.801 | 1.799 | 1.805 | 2.430 | 1.802 |
| c nm | 0.752 | 0.749 | 0.754 | / | 0.753 |
| Nitrogen adsorption P/Po = 0.19 | 9 | 11 | 10 | 18 | 8 |

TABLE 2

CHARACTERISTICS OF THE X-RAY DIFFRACTION DIAGRAM OF A STABILIZED AND DEALUMINATED Ω ZEOLITE PREPARED ACCORDING TO THE INVENTION AND HAVING AS PARAMETERS VALUES
a = 1.80 nm, c = 0.753 nm

| 2θ Cu Kα | d (nm) | I/I max. |
|---|---|---|
| 5.67 | 1.559 | <1 |
| 9.83 | 0.900 | 100 |
| 11.35 | 0.779 | 50 |
| 13.05 | 0.678 | 60 |
| 15.04 | 0.589 | 75 |
| 16.36 | 0.542 | 25 |
| 17.05 | 0.520 | 10 |
| 19.12 | 0.464 | 40 |
| 20.54 | 0.432 | 40 |
| 22.82 | 0.390 | 20 |
| 23.73 | 0.375 | 65 |
| 24.30 | 0.366 | 25 |
| 24.90 | 0.358 | 10 |
| 25.63 | 0.3475 | 40 |
| 26.27 | 0.3392 | 25 |
| 28.63 | 0.3117 | 40 |
| 29.28 | 0.3050 | 25 |
| 29.78 | 0.3000 | 25 |
| 30.96 | 0.2889 | 40 |
| 31.04 | 0.2881 | 40 |
| 34.16 | 0.2624 | 10 |
| 34.52 | 0.2598 | 10 |
| 34.58 | 0.2594 | 10 |
| 31.01 | 1.884 | 10 |

Example 7

From the aged samples obtained in example 6, five cracking catalysts are prepared by diluting zeolites, in a proportion of 20% by weight, in an amorphous silica of controlled granulometry similar to that of the zeolites, 4 g of each of these catalysts are introduced into the reactor of a MAT test microunit. The capacity of each catalyst to convert vacuum distillate (VD) is then determined in the following conditions:
  amount of treated charge: 1.3 g
  C/O=3
  injection time of the 1.3 g of charge=75 seconds,
  WHSV (weight hourly space velocity)=15 h$^{-1}$
  temperature T=480° C.

The charge (VD) has the following characteristics:

Density at 15° C. = 0.904    IP =    202° C.
S % by weight = 1.3          10% =   307° C.

-continued

N % by weight = 0.1         50% =   402° C.
Conradson carbon % = 0.32   90% =   510° C.
Ni + V (ppm) <1             FP =    585° C.
ASTM D 1160

Comparison of the Catalytic Performances

The results are expessed as follows:
Conversion of the charge in percent by weight
yield to gas ($H_2+C_1-C_4$ hydrocarbons)
yield to $C_5-220°$ C. gasoline
yield to LCO (middle distillates: 220°-380° C.)
coke Table 3 gives these performances for the 5 catalysts used.

TABLE 3

Results of MAT tests

| Catalytic Performances | Catalysts | | | | |
|---|---|---|---|---|---|
| | 1 OM2 | 2 OM3 | 3 OM4 | 4 HY | 5 Re Ω |
| Conversion % b.w. | 63.9 | 63.0 | 55.4 | 68.0 | 63.8 |
| Gas ($H_2 + C_1 - C_4$) | 15.1 | 14.6 | 13.0 | 17.5 | 14.5 |
| Gasoline $C_5$-220° C. | 45.2 | 45.1 | 38.9 | 45.3 | 45.3 |
| LCO (450-650° C.) | 26.1 | 27.3 | 25.7 | 20.8 | 26.8 |
| Coke | 3.6 | 3.3 | 3.5 | 5.2 | 4.0 |

These results show that, whereas the conversion, as defined conventionally (conversion=gas+gasolin+-coke), is lower for the Ω zeolite than for the reference Y zeolite, the sum of the yields to gas+gasoline+LCO+-coke is higher with catalyst (1), (2) and (5) than with the reference catalyst 4 (Y zeolite). Moreover, the yields to middle distillates (LCO) are much higher with these catalysts (1), (2) and (5). The non-stabilized and non-dealuminated Ω zeolite has an activity and a selectivity to middle distillates clearly lower than those of the Ω zeolites according to the present invention.

What is claimed as the invention is:

1. In a process for the catalytic cracking of hydrocarbons comprising contacting a hydrocarbon feedstock under cracking conditions with a cracking catalyst, the improvement wherein the catalyst contains an Ω zeolite whose $SiO_2/Al_2O_3$ molar ratio is higher than 10, whose sodium content is lower than 0.3% by weight, whose crystalline parameters "a" and "c" are respectively lower than 1.814 nm and 0.760 nm and which further exhibits a nitrogen adsorption capacity at 77 K (under a partial pressure P/Po equal to 0.19) higher than 5% by weight, said zeolite having a lattice of mesopores of radii ranging from 1.5 nm to 14 nm, the volume of the mesopores being equal to 5-70% of the zeolite total pore volume.

2. A process according to claim 1, wherein the crystalline parameter a of the Ω zeolite ranges from 1.814 nm to 1.794 nm, the crystalline parameter c being from 0.760 nm to 0.749 nm.

3. A process according to claim 2, wherein the sodium content of the zeolite is lower than 0.01% by weight.

4. A process according to claim 2, wherein the Ω zeolite exhibits a nitrogen adsorption capacity of 77 K (under a partial pressure P/Po equal to 0.19) higher than 11% by weight, said zeolite having a lattice of mesopores whose radii range from 2 nm to 6 nm, the volume of the mesopores being equal to 5-50% of the zeolite total pore volume.

5. A process according to claim 1, wherein the catalyst is produced from a synthetic omega zeolite containing alkali cations and organic cations and having a $SiO_2/Al_2O_3$ molar ratio of 6.5–10, said treatment comprising:

(a) a first step wherein the zeolite is subjected
  (i) to a removal of organic cations by roasting the zeolites for more than 20 minutes, in an inert gas and oxygen, wherein the molar content of oxygen is higher than 2%, and the temperature is 450°–650° C.,
  (ii) to a removal of alkali metal cations by at least one cation exchange at 0°–150° C., in a solution of an ionizable ammonium salt,
(b) a second step wherein the product of (a) is subjected to at least one roasting, at a temperature of 500°–900° C., in the presence of steam, for a time of more than ½ hour, and to at least one acid etching at a temperature of 0°–150° C., wherein the normality of the acid is 0.1–10N and the volume/weight ratio is 2–10 cm³/g, for a time of more than ½ hour.

6. A process according to claim 5, wherein, during the second step, the synthetic zeolite is subjected to at least one roasting in air or inert atmosphere at a temperature from 500° to 850° C., the temperature of the acid etching being from 0° to 150° C.

7. A process according to claim 1, wherein the catalyst contains at least one metal from the rare-earths group.

8. A process according to claim 2, wherein the catalyst contains at least one metal from the rare-earths group.

9. A process according to claim 3, wherein the catalyst contains at least one metal from the rare-earths group.

10. A process according to claim 4, wherein the catalyst contains at least one metal from the rare-earths group.

11. A process according to claim 5, wherein in step (b) the zeolite is roasted for more than 1 hour and the normality of the acid is 0.5–2N.

12. A process according to claim 5, wherein in step (b) the zeolite is roasted for 2 hours at 600°–650° C.

* * * * *